United States Patent [19]

Klose et al.

[11] 4,344,701
[45] Aug. 17, 1982

[54] MICROFICHE RECORDING SYSTEM WITH TRAVELING FILM HEAD

[75] Inventors: Peter H. Klose, Troy; Herbert C. Ovshinsky, Oak Park, both of Mich.

[73] Assignee: Energy Conversion Devices, Inc., Troy, Mich.

[21] Appl. No.: 227,957

[22] Filed: Jan. 23, 1981

[51] Int. Cl.³ .............................................. G03B 27/44
[52] U.S. Cl. .................................. 355/51; 346/76 L; 355/54
[58] Field of Search .................. 346/76 L; 355/50, 51, 355/40–43, 53, 54

[56] References Cited

U.S. PATENT DOCUMENTS

| | | | |
|---|---|---|---|
| 3,867,030 | 2/1975 | Tanaka | 355/41 |
| 4,123,157 | 10/1978 | Klose et al. | 355/54 X |
| 4,137,078 | 1/1979 | Izu et al. | 346/76 L X |

Primary Examiner—Richard A. Wintercorn
Attorney, Agent, or Firm—Lawrence G. Norris

[57] ABSTRACT

A controllable film holding and tensioning system for a movable intermediate film strip dispensing head provides a stable and non-film damaging positioning of intermediate images carried on the film strip as it is moved from an exposure station to a final station for image transfer to an archival microfiche film under conditions where bowing stresses are applied to the intermediate film at one or more of the processing stations. An improved pretensioning feature for the source reel minimizes the occasional jamming encountered with conventional cassette film dispensers. Automatic protection is provided by an intermediate film strip break sensor and an end-of-film sensor to guard against archival record loss from these causes. Unique film cassette designs are also described.

26 Claims, 25 Drawing Figures

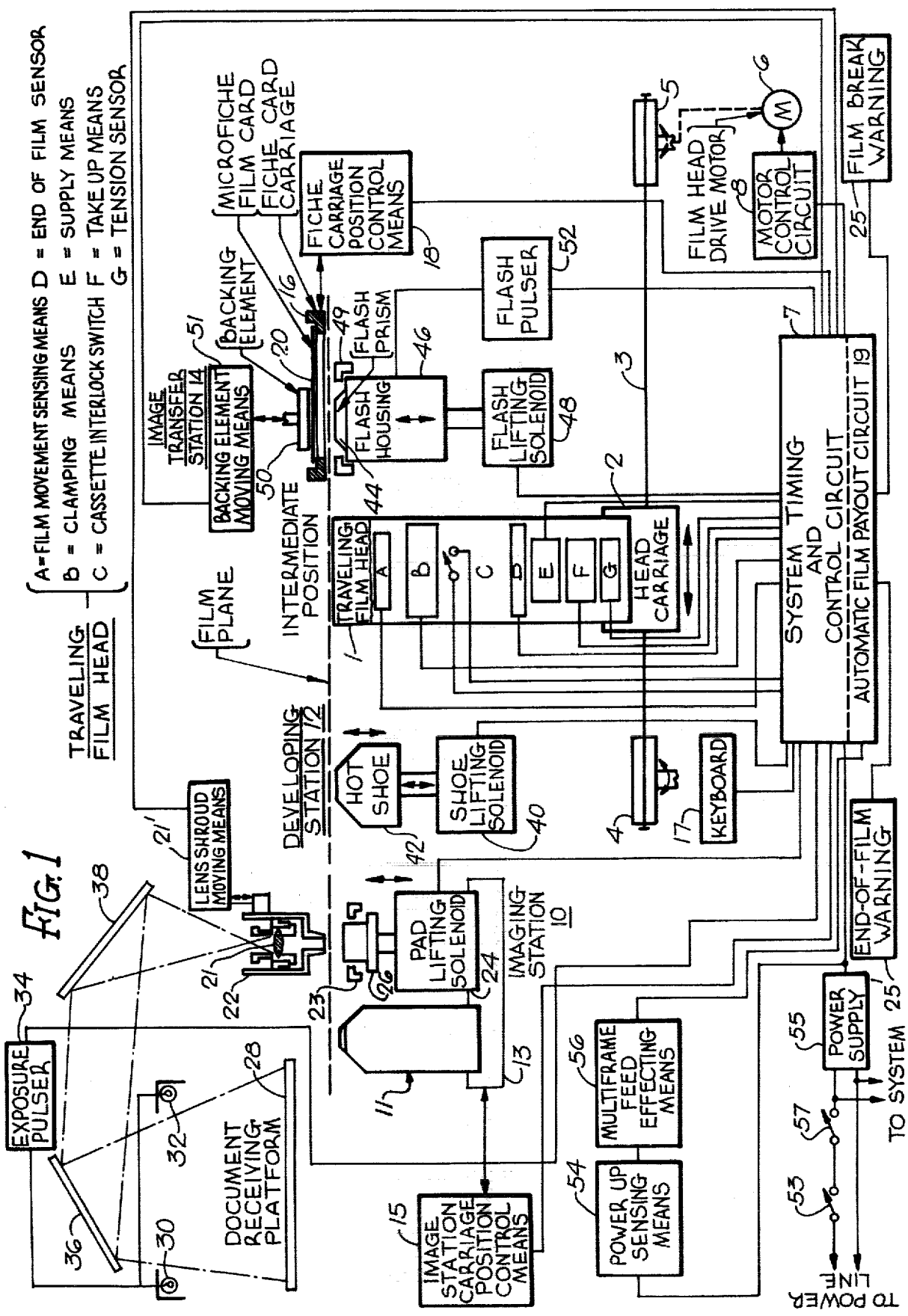

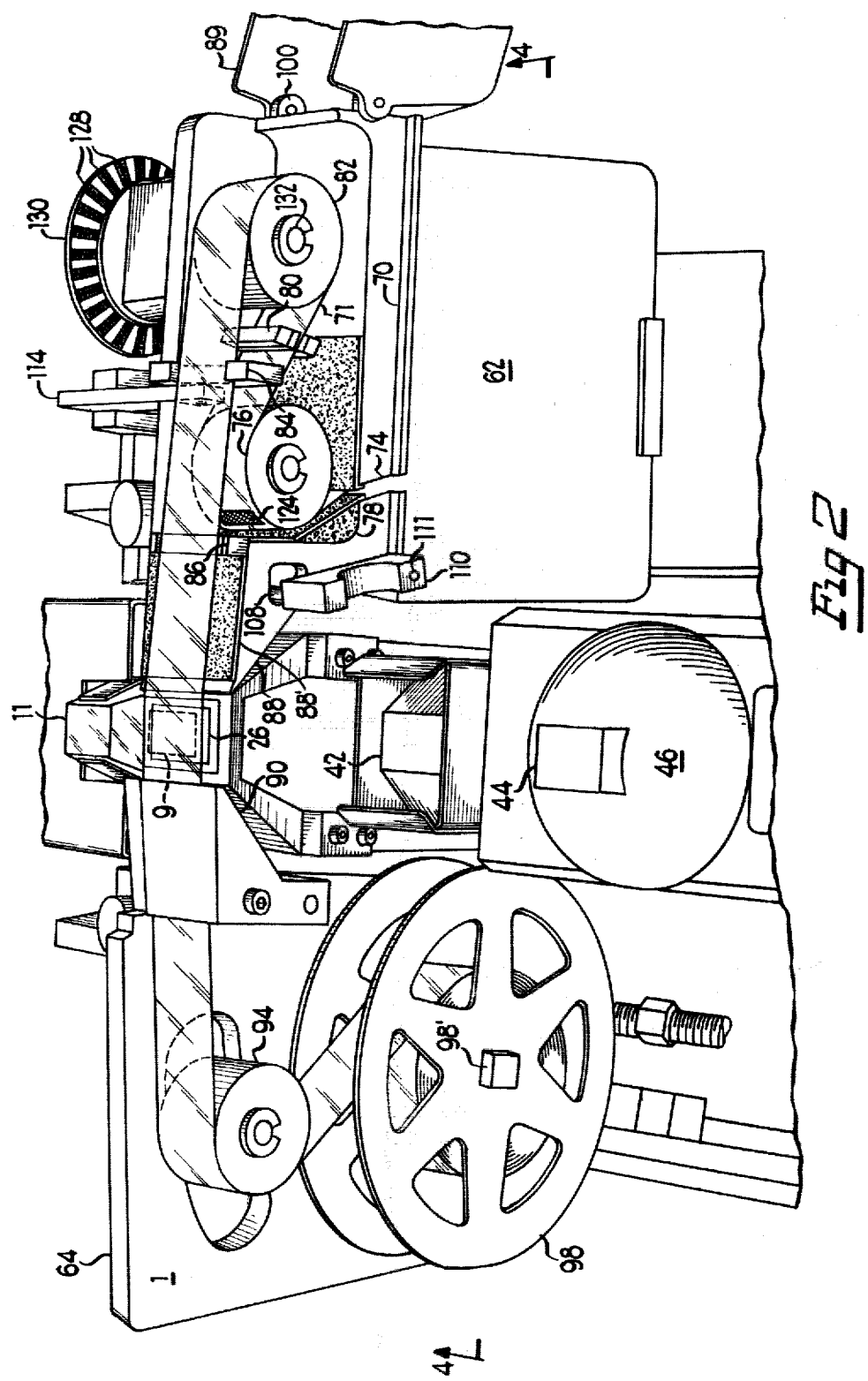

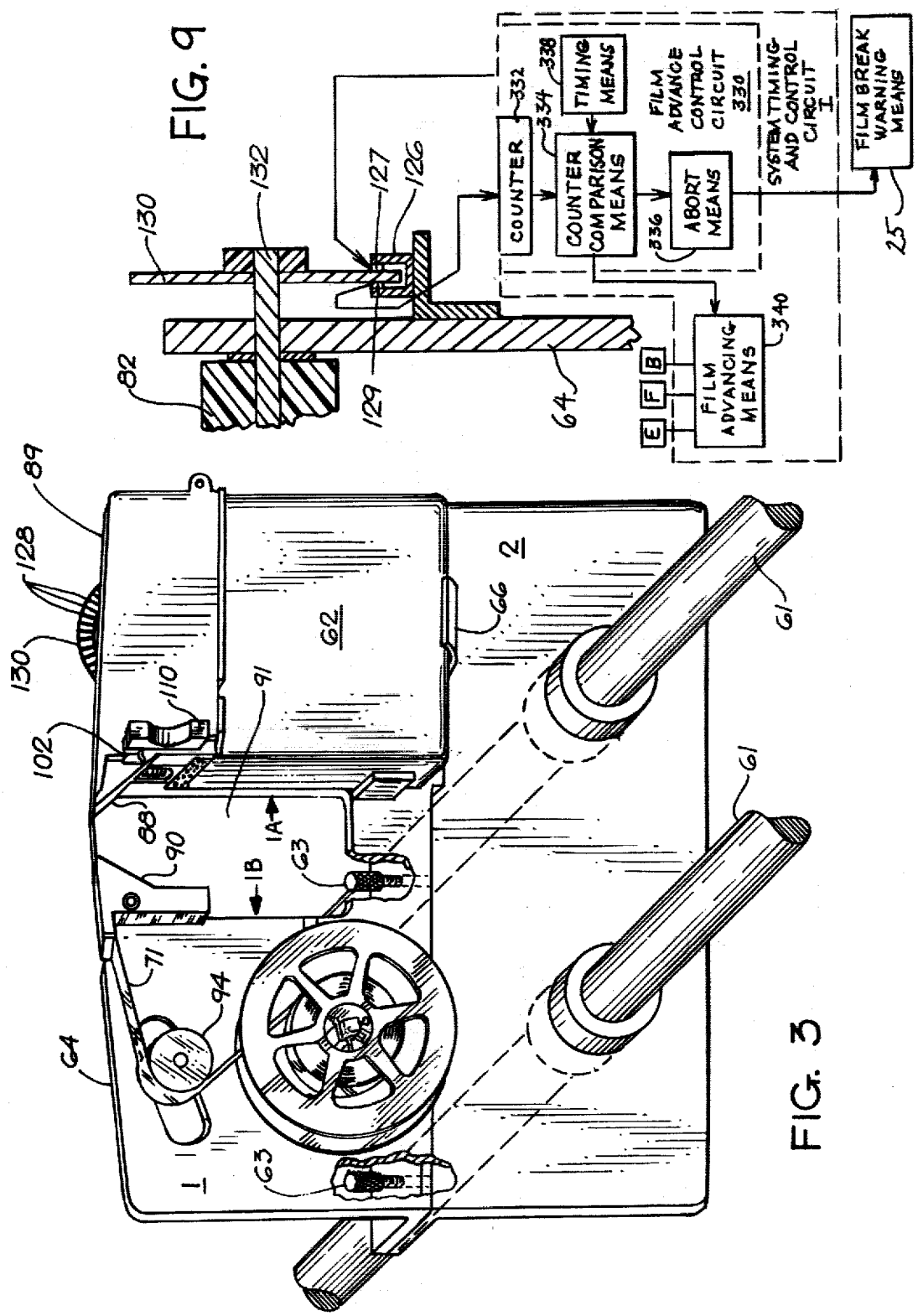

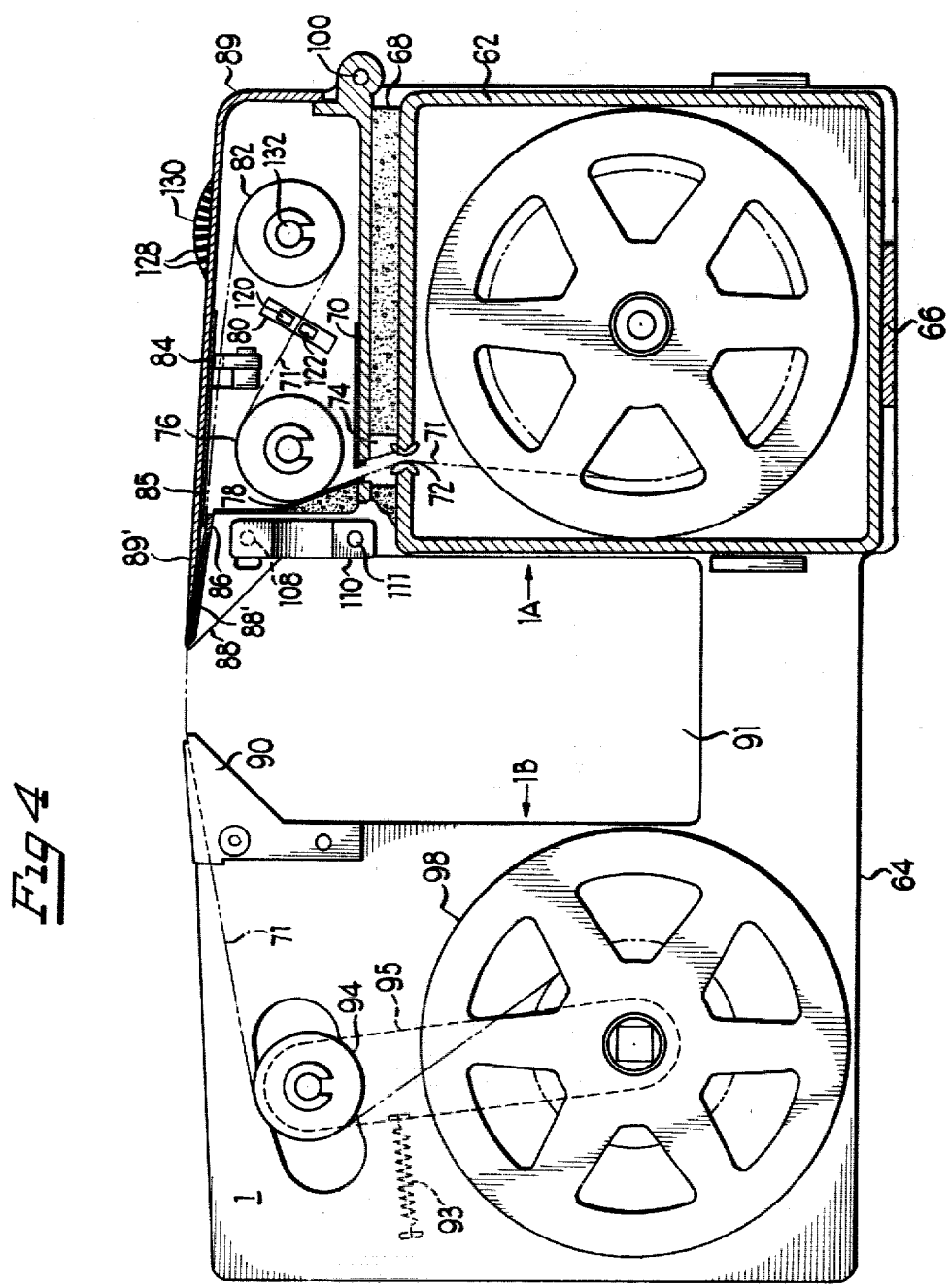

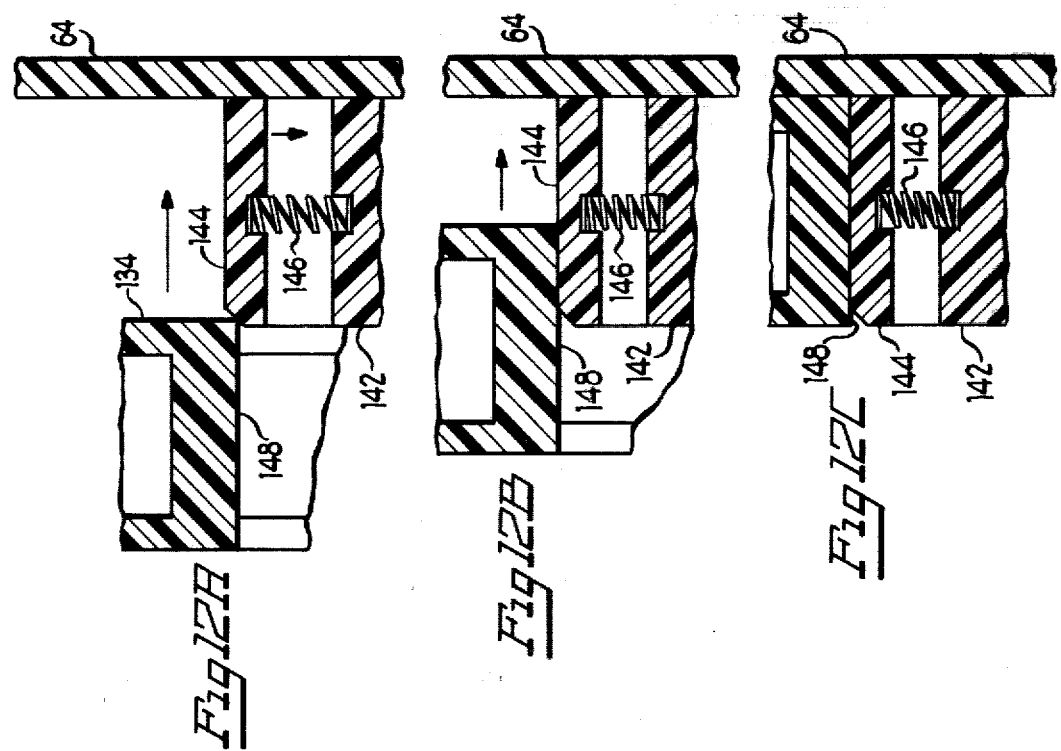
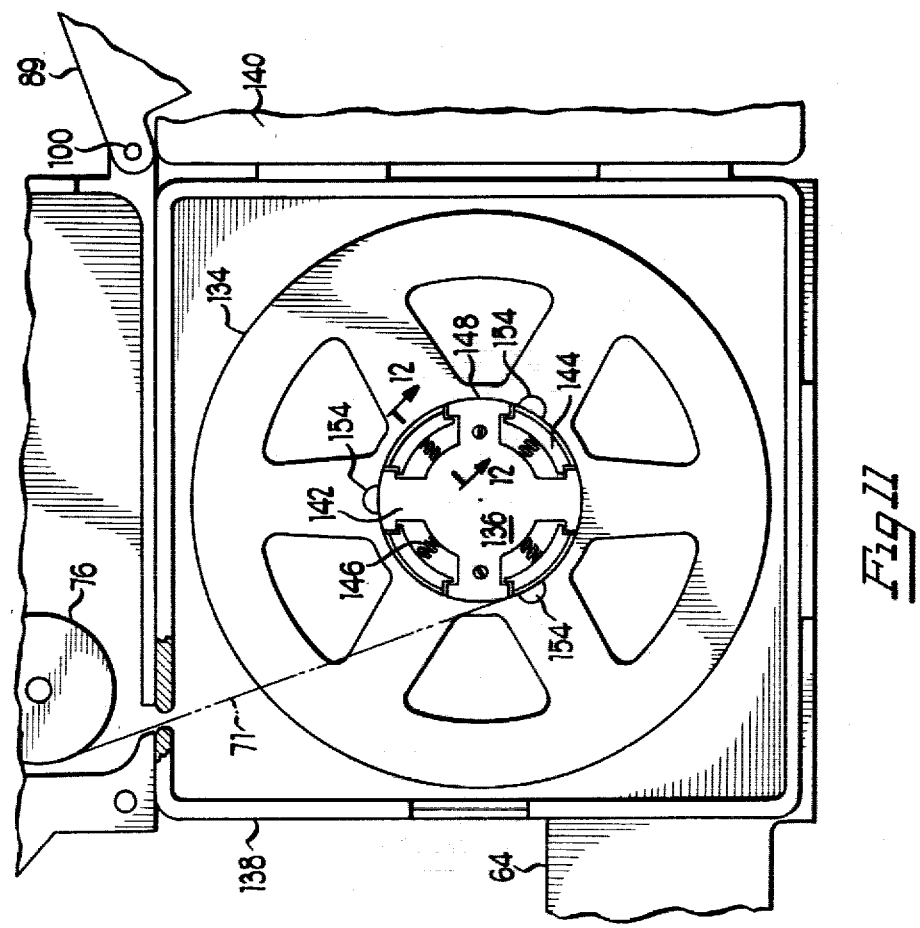

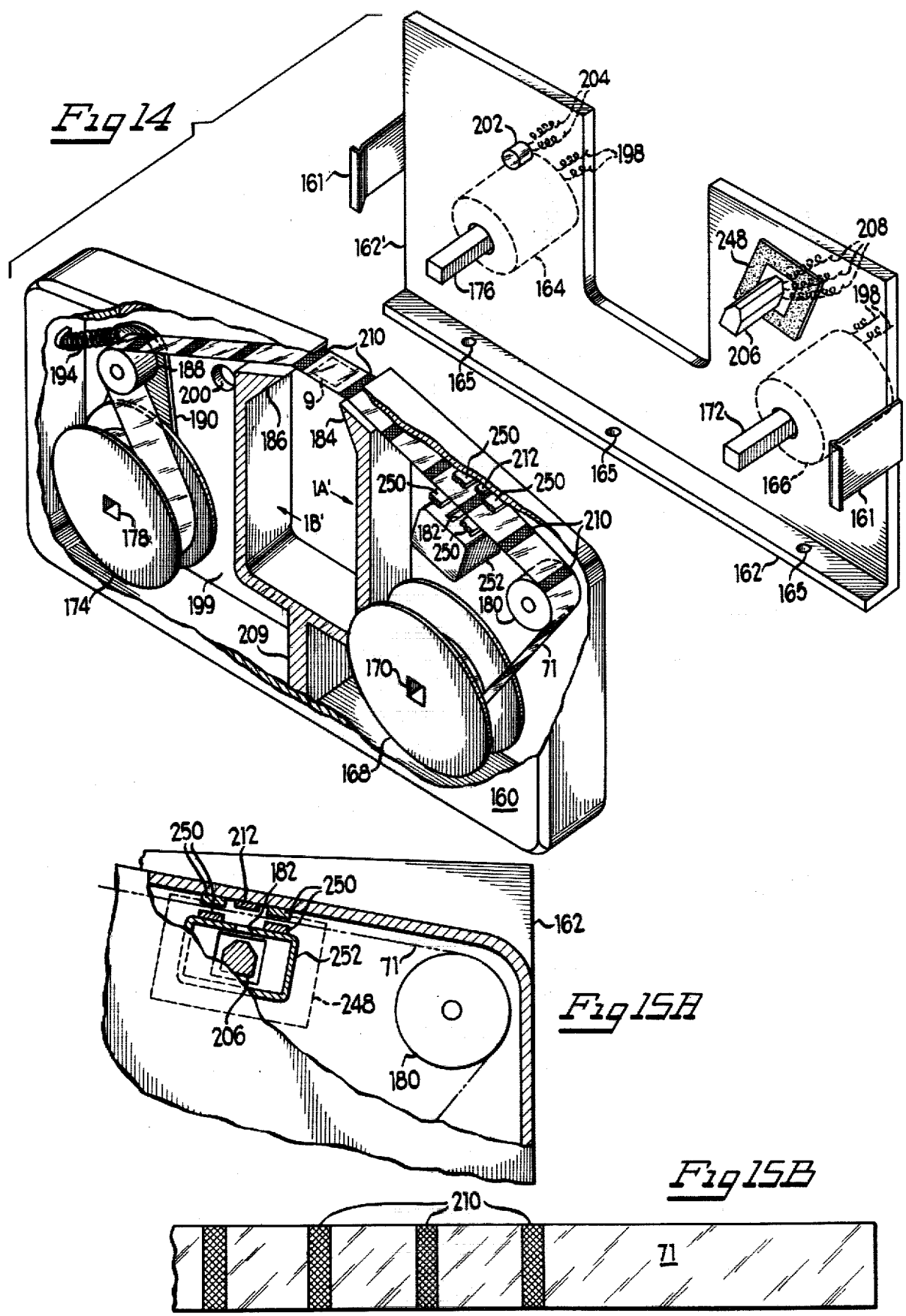

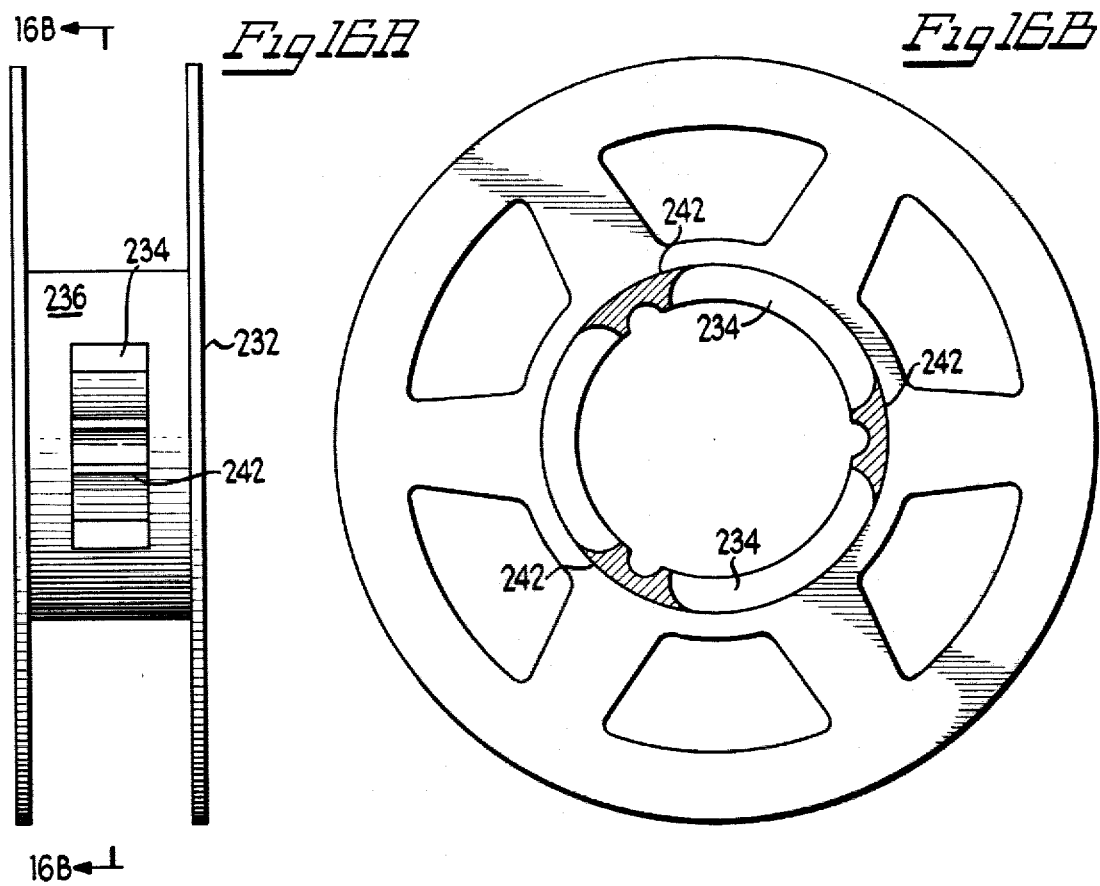
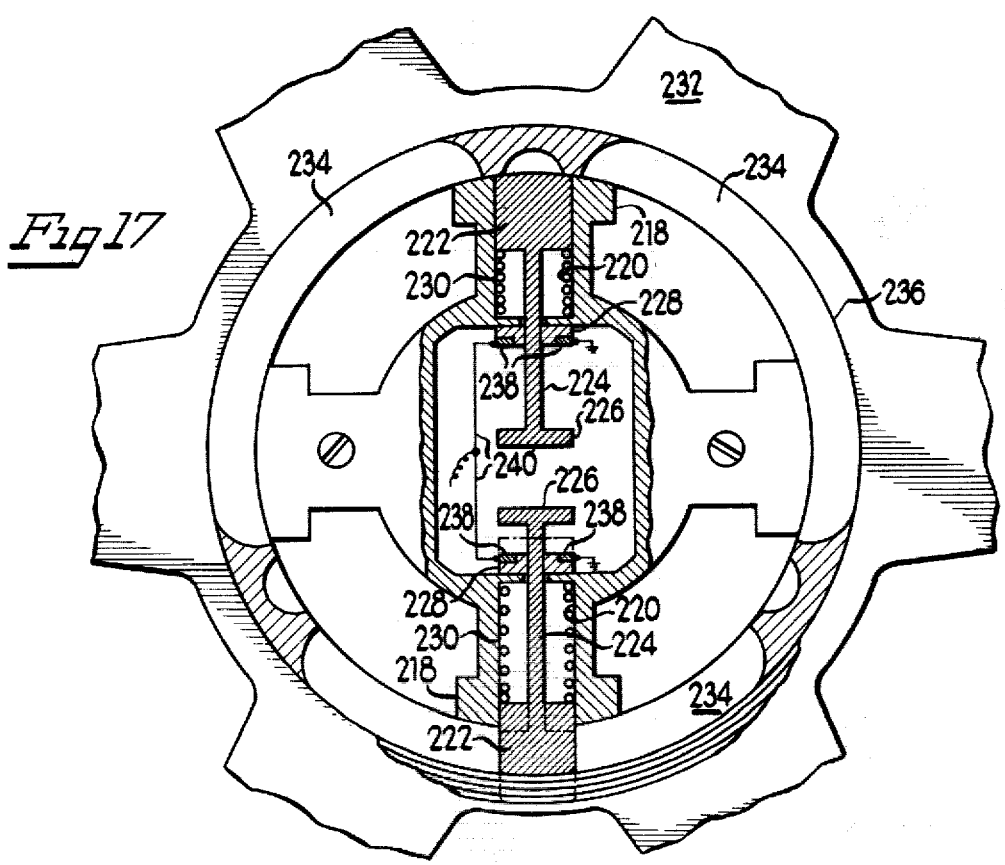

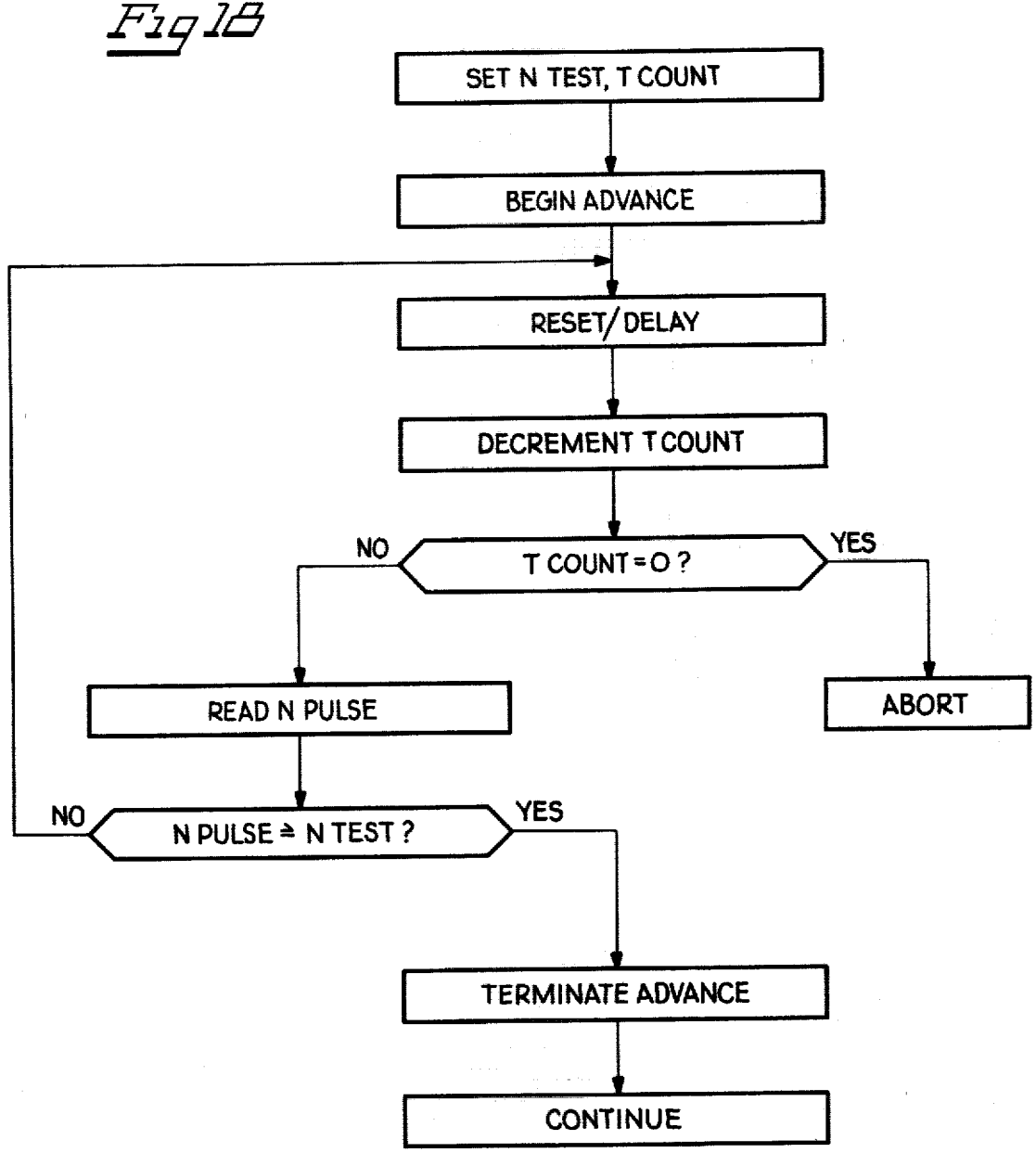

MICROFICHE RECORDING SYSTEM WITH TRAVELING FILM HEAD

BACKGROUND OF THE INVENTION

The present invention has its most important application in annotatable archival recording systems employing an intermediate film strip carried by a movable film head having supply and takeup reels for the film strip and which is moved between an imaging station and an image transfer station under conditions where bowing stresses are applied to the selected areas of film strip to be imaged at one or more of these stations.

There has been developed by the applicants and co-workers an archival hard copy microfiche recording system which reflects light off of a document placed on a document-receiving platform and projects an image of it in greatly reduced form onto an initially transparent intermediate dry silver film strip carried by a film head unit. The film strip is dispensed from a cassette mounted on the film head, and is fed by film advancing means to an imaging region where a selected area of the film strip to be exposed can receive the projected light image. A pressure element presses the selected area of the film strip against a planar backing aperture defining a projection plane and an imaging area, and the film is then exposed to the light image. The film head is next moved along guides from the imaging station to a developing station, where a hot shoe pressing against the exposed area of the film causes development of the image to form an opaque image in the exposed areas thereof. The film head is then moved to an image transfer station, where the image on the dry silver film is to be replicated on a positive initially opaque microfiche film card of the photo-developing type (See U.S. Pat. No. 4,137,078 issued June 30, 1979 to Izu and Ovshinsky). The microfiche card is held indexed on a movable carriage so that a predesignated frame of the card receives the image on the intermediate film. A pressure element presses the film card and the intermediate film strip together between the output prism of a flash lamp housing and a backing plate. Image transfer is accomplished by energizing the flash lamp to direct light through the intermediate film, immediately rendering transparent the previously opaque areas struck by the high intensity flash lamp light on the selected frame of the microfiche film card. To replicate a new image the film head is returned to the imaging station, where the cycle is repeated.

The bowing stresses applied to the intermediate film during the foregoing processes may cause erratic shifting of the film, resulting in a lack of proper image positioning on the microfiche film card and in some cases image destruction. The intermediate film is typically subjected to bowing stress during both the development and image transfer operations, and is thus vulnerable to such shifting. The prior art discloses neither a recognition of this problem in traveling film head systems nor a remedy for it. The closest prior art is disclosed in U.S. Pat. No. 4,123,157, issued Oct. 31, 1978 to Klose and Ovshinsky. The system disclosed therein uses an intermediate film strip advanced by a takeup motor and tensioned by a slip brake, and discloses no provision for retaining accurate image centering.

The microfiche card may be examined via a "read" mode of the system. With the cassette carriage positioned away from the imaging lens, the microfiche film card carriage, which is accurately locatable in x and y directions by means of an indexing system, is moved on a track to a station under the lens. An illumination system is moved next to the microfiche film card carriage, and then the chosen frame of the card is projected back to the document receiving area. No severe film shifting problems are encountered in carrying out simple "record" and "read" operation. Only a major shift of the intermediate film may cause loss of record.

The system also possesses the capability of "annotating" or "updating" existing records stored on the microfiche film. This arises from the nature of the two film systems used. The intermediate film is of the reversal type; dark areas on the chosen hard copy replicate as transparent areas and light areas replicate as opaque upon development. Hard copy having black lettering on a white page will thus replicate on the intermediate film as an opaque rectangle with transparent letters. The microfiche film, however, is an initially opaque photodeveloping positive film which is rendered irreversibly transparent where struck by high intensity light during flash exposure. Thus, dark markings on the original document replicate as irreversibly transparent images on an otherwise still opaque microfiche film frame. These remaining opaque regions on the microfiche film remain "annotatable", i.e. convertible in that they can be rendered transparent by a subsequent flash exposure. It is this aspect of the microfiche film that allows for updating of microfiche records. As used throughout this disclosure and in the appended claims the term "annotatable" will be understood to refer to a film that is capable of accepting a second image after exposure and development of a first image in the same general region.

Thus, if a copy of a document is imaged on a microfiche film card frame where the indicia on the document are dark lines on a light background, these dark lines are now stored as irreversible clear lines on the microfiche film card. To update the microfiche film card with new entries in a specified still convertible area of a microfiche film card frame one prepares on intermediate film a fresh image consisting of the new entries only. This is accomplished by using as a source for the new image a dark-line record on a white background placed on the document receiving platform, e.g. typewritten black text on white paper. The new image, consisting after development solely of transparent new entries on an otherwise opaque imaging area, is then replicated at the transfer station onto the microfiche film card frame. These new entries are thus replicated as additional irreversible clear indicia on the selected frame. Proper registry of the new record is achieved by using the "read" mode of the system to assist in orienting the new entries on the document receiving platform before the intermediate film is exposed to receive the new image. Here an image of the chosen frame to be updated is projected back onto the document receiving platform, using the "read" mode previously described. A white sheet of paper bearing the new record indicia is then placed on the document receiving platform and moved around until the new indicia are properly positioned with respect to the projected image of the microfiche film card. The frame is now updated by carrying out a conventional "record" cycle, i.e. the microfiche film card is returned to the transfer station, the film head is moved to the imaging station, whereupon the image of the new record indicia is projected, exposed, developed, and replicated onto the microfiche film card frame at the transfer station. Here even a minor erratic image shift from exposure to transfer can become of major importance, e.g. a bookkeeping update entry prints onto the wrong line or column. Also, if the bowing stress should shift the transparent unimaged margin of the intermediate film adjacent the imaged area into the projection field at the transfer station this can obliterate the previous record along a narrow band at the side of the microfiche film card frame, which receives the unwanted band of flash flamp light through the transparent portion of the intermediate film undesirably shifted into this field. It thus becomes essential that the intermediate film be prevented from undergoing significant erratic shift during its movement between the imaging and transfer stations. In practice, this latter condition is difficult to fulfill. One of the objects of this invention is to hold the erratic movement of the intermediate film to a harmless minimum without risk of damage to the film under the bowing stresses involved.

It is clear that a break in the intermediate film can cause complete wipe-out of the microfiche image during annotation because then the entire flash lamp projection field strikes the previously imaged frame of the microfiche film card exposed for annotation, and so all areas of the exposed frame are made transparent, obliterating the image thereon. Hence, another object of this invention is to achieve protection from such an occurrence.

The end-of-film condition acts like a "film break" situation and obviously occurs frequently as each roll of intermediate film is used up, and so a special additional sensing system for this condition is desirable. Another object of this invention is to make special provision to sense an imminent end-of-film situation and guard against record loss therefrom.

SUMMARY OF THE INVENTION

In accordance with one of the features of the invention, there is provided in an archival microfiche recording system like that previously described a traveling film head provided with a film locking means on the film head, which locking means is operable to lock the film against erratic shifting under bowing stresses applied thereto as it is carried between the imaging, developing and image transfer stations. In one form of the invention, the locking means include a movable pressure applying member movable between a clamping position where the member clamps at least one lateral inner side of the film strip to be imaged and a release position. Control means are provided for actuating the pressure applying member to its clamping position during the imaging of the intermediate film and during the movement of the film head to the developing and image transfer stations. After transfer of the image from the film strip to the microfiche film at the image transfer station and before the next imaging of the film on the film head, the control means operates the clamping means to its release position and an unimaged area of the film is brought into an imaging position.

The clamping means most preferably effects its clamping action to the film strip only on the supply or inner side of the exposed area thereof to be imaged, the film being compliantly tensioned by a tensioning means on the opposite side thereof so that the bowing stresses applied to the film are less likely to break or damage the film, since the clamping action on the film is applied to only one margin of the exposed area thereof. Since preferably only one lateral margin of the selected intermediate film strip area is clamped, the bowing forces applied during the imaging and image transfer can shift the portion of the film beyond the clamped margin thereof. The degree of such shifting at the imaging and image transfer stations is equalized by assuring a movement of the pressure elements pressed against the film at these stations to cause the same degree of bowing of the intermediate film strip.

A further feature of the invention comprises mounting the aforesaid movable pressure applying member upon a cover, which preferably also forms a light shield and in some cases also a dust shield for the portion of the film extending from the cassette or supply reel. The cover with the pressure applying member is most advantageously spring urged into a clamping position. Release of the pressure applying member from the film is achieved by control means including a solenoid which pushes the cover against the restoring force of the spring.

In accordance with a still further feature of the invention, the film head includes a common frame carrying all of the various intermediate film support elements, such as a cassette or supply reel receiving means, and the various guiding, tensioning and take-up means which support and guide the film from the point where it unwinds from a supply reel and the point where it is received by a take-up reel or the like. This frame, which includes suitable light shielding means for protecting the film from dust and light, is removably attached to a carriage so that film changing and threading, if necessary, can be conveniently carried out by disconnecting the common frame from the carriage so that the frame can be brought to a convenient location for film changing and threading. In alternate forms of the invention, the frame is designed to removably receive a supply reel or film cassette.

In accordance with another feature of the invention, a supply reel support means has associated therewith unique film pay-out retarding means which provides a retarding force against which a film tensioning means operates to pull the film taut so as to insure a smooth and accurate feeding and positioning of the intermediate film.

Still another feature of the invention is the provision of warning and system shut-down means which becomes operative during breakage of the intermediate film, or when the last available area of the film strip has been imaged. These means most advantageously include a rotatable wheel driven by the movement of a roller over which the intermediate film passes. The wheel has markers sensed by detecting means which generates pulses as the markers move by the same. During the desired movement of an unimaged area of the intermediate film strip into an imaging position during film advancement, control means are rendered operative to the output pulses generated by the detecting means. These pulses are counted during film advance, the count being used to signal the end of the film advance operation. Should this pulse count fail to reach the requisite number during a prescribed time interval, as would be the case if the marker wheel stopped turning because of loss of film tension caused by film breakage, the control means operates an alarm and aborts the replication sequence.

Another feature of the invention is an end-of-film sensing means which preferably takes one of two forms. In one form, the means includes a marker placed on the intermediate film strip, which marker is moved into position opposite a marker detecting means after the last area of the intermediate film has been imaged and a film advance operation is initiated. In another form, the film tension sensing means is incorporated in the hub of the supply reel and senses the decrease in film tension as the last turn of the film winding on the reel appears. A control means responsive to the marker detecting or tension sensing means operates an alarm means and renders the recording system inoperative.

Other objects, advantages and features of the invention will become apparent upon making reference to the specifications to follow, the drawings and claims.

DESCRIPTION OF DRAWINGS

FIG. 1 is a block diagram of the control system of the microfiche recording system of the invention;

FIG. 2 is a perspective view of an exemplary form of the intermediate film head positioned at the imaging station with the film head cover in the open position;

FIG. 3 is a perspective view of the traveling intermediate head mounted on a carriage supported on guides;

FIG. 4 is a partially sectioned elevational view of the intermediate film head with portions of the cassette housing and film head cover portions thereof cut away;

FIG. 9 is a side sectional view of the film advance sensor and encoder wheel assembly of the film head;

FIG. 11 is a fragmentary elevational view of the supply reel and hub assembly;

FIGS. 12A-12C are enlarged fragmentary sectional views showing in sequence the progressive engagement of the supply reel with the friction hub assembly;

FIG. 14 is a perspective exploded view in partial section of a cassette and a vertical wall of the support frame therefor which forms a second alternative form of the invention where the cassette has pre-loaded reels, the figure also showing lockable motors in dashed lines being carried by the vertical wall of the frame;

FIG. 15A is a partially sectioned fragmentary view of the upper part of the film supply section of FIG. 14 showing details of the film advance sensor projecting inside the sensing aperture shroud when the cassette is mounted to the carriage wall shown in FIG. 14;

FIG. 15B shows a portion of the intermediate film strip provided with framing markings;

FIGS. 16A and 16B show end and partially sectioned side elevational views of a modified film supply reel; and FIG. 17 is a fragmentary side elevational partly sectioned view of the modified reel of FIGS. 16A and 16b mounted on a modified friction hub, the friction shoes and springs like those shown in FIGS. 11 and 12 of the hub having been omitted for clarity, the hub being partially cross-sectioned to show details of a pair of end-of-film sensing switches.

FIG. 18 is a flow diagram showing program control during intermediate film advance.

DESCRIPTION OF EXEMPLARY FORM OF THE INVENTION

Figure 5A:
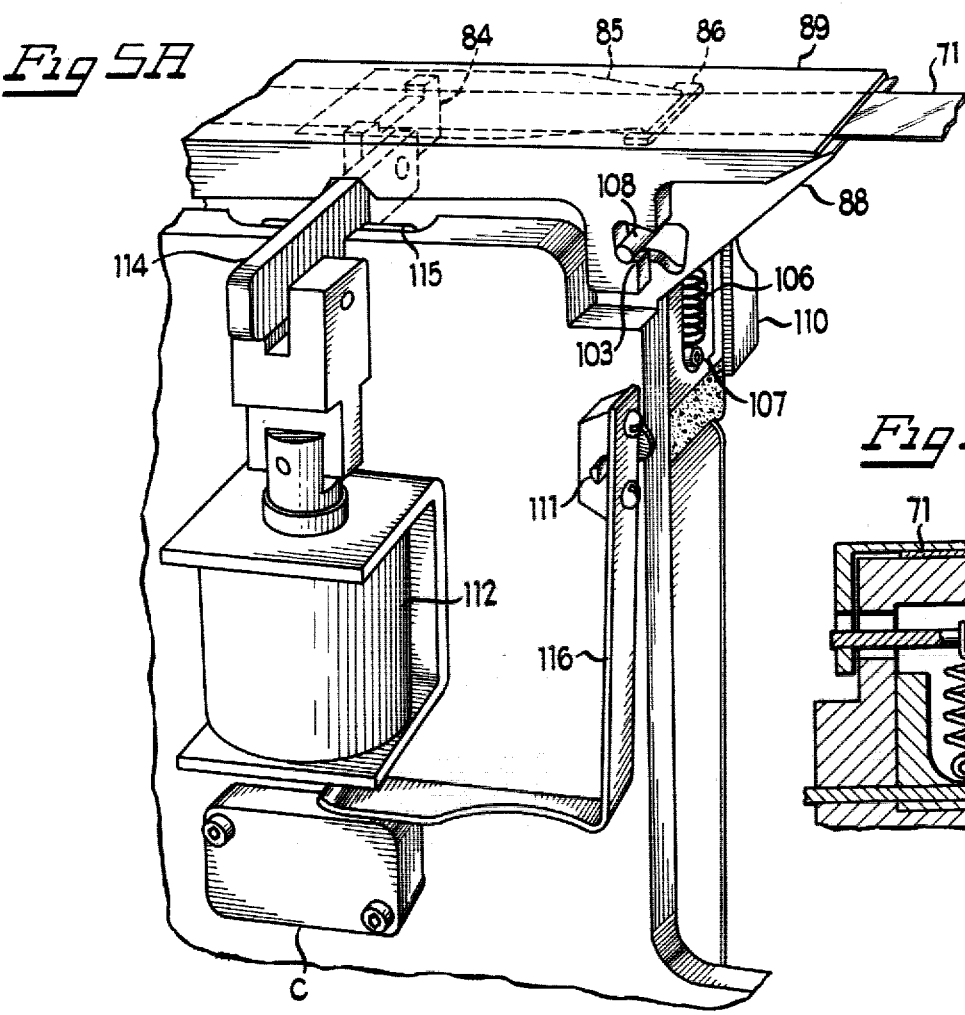
FIG. 5A is a fragmentary perspective view from the rear of FIG. 4 of a portion of the film head showing the film clamp lifting solenoid and cover latch, with the film clamp lifter, clamping blade, and clamping block shown in dashed lines.

FIG. 1 includes a block diagram of the control system for sequencing the operation and movement of an intermediate film head 1 and head carriage 2 between various stations of a microfiche recording system. The head carriage is advanced to the various stations illustrated in FIG. 1 by tension in a belt 3 extending between an idler pulley 4 and a motor driven pulley 5. A pulley drive motor 6 is controllably driven in both directions by a system timing and control circuit 7 operating through a motor control circuit 8. The stations illustrated are an imaging station 10, where the exposed area of the initially transparent intermediate film strip on the film head 1 is exposed to a light image, such as light reflected off of a hard copy, a heat-applying developing station 12 where the light-exposed areas of the intermediate film are rendered opaque, and an image transfer station 14. A microfiche film card carriage 16 at the image transfer station 14 positions, under control of a fiche carriage position control means 18, a selected frame of a microfiche film card 20 for reception of an image last formed on the film strip carried by the film head 1. The microfiche film card 20 is preferably made from a photo-developing initially opaque archival film of the dispersal type disclosed in U.S. Pat. No. 4,137,078 issued to Izu and Ovshinsky, wherein a transferred image is formed automatically upon exposure to a high intensity flash of radiant energy, such film being completely insensitive to exposure to normal room ambient light or even direct sunlight. The film carried by the film head is preferably more light sensitive and is latently imaged by the relatively less intense light reflected and imaged from hard copy. The intermediate film carried by the film head is preferably a dry-silver heat-developed film.

As used herein, the term film head refers to a frame removably attached to a carriage, and a film supply unit removably mountable on the frame. The film head 1 carries a film supply means E, a film takeup means F, and a film clamping of holding means B. In various embodiments of the invention all three are sequentially controlled by the system timing and control circuit 7. For example, the supply means E may include a supply reel or cassette, and various guide rollers as well as film driving means where the supply reel is to be driven. The takeup means F may include a takeup reel and guide roller means as well as film tensioning means and takeup reel drive means. In addition, the film head may include an end-of-film sensor D which may respond to a marking on the film. The film head may also include a tension sensor G responsive to tension in the film. The end-of-film sensor D and tension sensor G perform control functions which respond to end-of-film or film breakage and disable operation of the system under these circumstances. In various ways, when film breakage occurs, which would, for example, be detected by the absence of film movement by sensing means A, a film break warning 25 is energized and further operation of the system is shut down to avoid an image transfer operation. Similarly, when the sensor D senses the end of the film, the end of film warning 25' is energized and further operation of the recording system is also prevented. The film head 1 may also include a film head interlock switch C which communicates the status of a light sealed film dispenser cover to the system timing and control circuit 7, so that the system cannot be operated with the cover open and the film inside thus subject to light fogging.

Figure 7A:
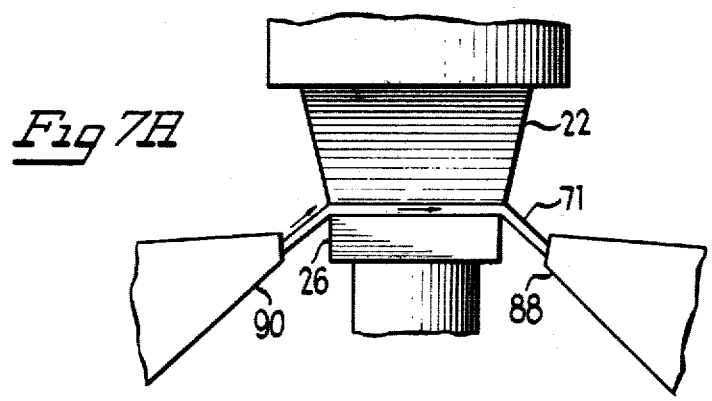
FIGS. 7A-7C are fragmentary sectional enlarged views of the region between the payout and takeup lip regions of the film head illustrating the controlled film strip bowing action at the imaging, developing, and transfer stations.

Initially, the film head 1 is moved to the imaging station 10, where an imaging area of the film strip is placed under a projection lens 21 contained in a lens shroud 22 (see FIG. 7A). The film clamping means B is actuated to a film release condition and an area of fresh intermediate film strip is advanced by driving the supply or takeup means E or F. Payout length is governed by the film movement sensing means A, which effects generation of electrical signals measuring the length of film payout to the system timing and control circuit 7. In the preferred embodiment the film movement sensing means A effects generation of a series of pulses as the film advances, the number of which measures the payout length. After the requisite film advance, the system timing and control circuit 7 stops driving of the film supply or takeup means E or F and actuates the clamping or holding means B back to a film holding condition, whereupon a signal from the system timing and control circuit 7 raises a backing pad 26 up against a pad limit stop 23. A subsequent command from the system timing and control circuit 7 actuates a lens shroud moving means 21' to lower the lens shroud 22 to clamp the intermediate film between the backing pad 26 and the base of the lens shroud 22. A document receiving platform 28 is next illuminated by flash lamps 30 and 32 energized by the exposure pulser 34 on command from the system timing and control circuit 7, the image of the platform and its contents being relayed to the projection lens 21 by two mirrors 36 and 38. On command, the pad lifting solenoid 24 drops the backing pad 26, and the lens shroud moving means 21' lifts the lens shroud 22, thereby releasing the film. The film head 1 is now moved to a developing station 12, where a shoe lifting solenoid 40 controlled by the system timing and control circuit 7 raises a hot shoe 42 (see FIG. 7B) against the imaging area 9 (see FIG. 2) of the film strip 71 for a predetermined length of time set by the system timing and control circuit 7, whereupon the shoe lifting solenoid 40 drops the hot shoe. The film head 1 is then moved to a position which places the imaging area 9 of the film strip over a flash prism 44 on a flash housing 46. A selected frame of a microfiche film card 20 on a microfiche card carriage 16 is moved into appropriate position over the flash housing 46 with the system timing and control circuit 7 controlling the microfiche carriage position control means 18. The desired frame of the microfiche film card 20 is selected by operation of keys of a keyboard 17 which cause the control circuit 7 to operate the microfiche carriage position control means 18. On command of the system timing and control circuit 7, a flash lifting solenoid 48 raises the flash housing 46 against a limit stop 49. A backing element 50 is lowered by the backing element moving means 51 so as to press the imaging area of the intermediate film strip into intimate contact with the microfiche film card 20 and a backing element 50 (see FIG. 7C). Image transfer is achieved by actuating the flash tube (not shown) in the flash housing 46 by a command from the system timing and control circuit 7 operating through a flash pulser circuit 52. Immediately after exposure, the lifting solenoid 48 drops the flash housing 46, and the backing element moving means 51 raises the backing element 50, thereby releasing the two films.

The pad lifting solenoid 24 and a projection light source 11 are mounted on an image station carriage 13. A station carriage position control means 15 is commanded by the system timing and control circuit to position either the pad lifting solenoid 24 or the projection light source 11 under the lens 21. For reading or updating a microfiche the fiche card carriage 16 is moved by the fiche carriage position control means 18 to a position under the lens 21, and the projection light source 11 is moved into position below it so as to project the image on the microfiche back onto the document receiving platform 28 for inspection and, where an add-on of information is to be made on the frame of the microfiche card involved, an overlay of the added information can be properly positioned over the projected image. The recording system carries out the desired "read", "record" and microfiche frame positioning operations as commanded by the operator by depressing the appropriate keys on a keyboard 17 connected to the system timing and control circuit 7. The system timing and control circuit is powered by a power supply 55 connected to the power line by a main power switch 53 and a system interlock switch 57 actuated to an open position by opening a system access door (not shown). In the exemplary form all sequencing and sensing operations are carried out by a program stored in a minicomputer memory, the minicomputer constituting a portion of the system command and control circuit 7.

To insure that the fresh intermediate film paid out during the film advance operation is not light fogged from prolonged exposure of the cassette to the ambient light in the system, the system timing and control circuit 7 commands the immediate advance of a preset number of frames of intermediate film every time the power switch 53 is turned on.

This is accomplished by program branching employing a routine microprocessor feature: a microprocessor forming part of the system timing and control circuit 7 responds to the onset of electrical power from the power supply 55 by automatically steering its program counter to an initialization routine stored in a "read-only" memory unit, which is also part of the system timing and control circuit. This steering is referred to as the "power-up reset" function, and is common to virtually all advanced microprocessors, such as the Zilog Z-80 and the Intel 8085. Functionally, this feature is shown outboard of the system timing and control circuit 7 in FIG. 1, and is labeled "power up sensing means 54"; however, it should be understood that the actual circuit means are part of the system timing and control circuit. The initialization routine commands the immediate advance of a preset number of frames of intermediate film, and is shown functionally in FIG. 1 as "multi-frame feed effecting means 56". This routine alters the program flow so as to cause normal signal sequencing of the supply means E, the takeup means F, and the clamping means B to recycle a preset number of times before normal program flow is resumed.

A similar fogging problem arises during the loading of a fresh film dispenser, since normal room light is much more intense than the ambient light in the system. A similar film advance is initiated by mounting a normally closed interlock switch 57 to a system access door (not shown). Opening the door to replace the intermediate film dispenser disconnects power from the system. Upon startup after loading the film advance routine is invoked as before.

Refer now to FIGS. 2, 3 and 4, which show the details of an exemplary film head 1. FIG. 3 shows the traveling film head 1 removably mounted as by screws 63 on the carriage 2 guided for horizontal movement on guide rods 61. All electrical units on the film head 1 are wired to the system timing and control circuit 7 via connector plugs (not shown) to facilitate head removal. FIG. 2 shows the film head positioned at the imaging station 10. The backing pad 26, the hot shoe 42, the flash prism 44, and the projection light source 11 are also shown. The film head is shown as including a film supply section 1A including a removable film dispensing cassette 62 mounted on a film head frame 64 and held in position between a cassette support ledge 66 and a compliant light-tight strip 68 (FIG. 4) affixed to the bottom of a top ledge 70 on the frame 64. The intermediate film strip 71 exits the cassette through a light tight slot 72 and then passes through a corresponding slot 74 in the compliant light-tight sheet 68 and the top ledge 70, next around an idler roller 76 where it presses against a compliant friction pad 78 which places a drag force on the film, and thence through an end-of-film sensor unit 80. The film strip 71 then passes around an encoder roller 82 and back over a film clamp lifter 84, then over a clamping block 86 where it then exits the film supply section between a payout lip 88 and a pad 88′ of a film head cover 89 where one frame width of the film strip is exposed for external processing at what may be called an imaging area of the film head. The frame 64 has a large open region 91 between the film supply section 1A and the film takeup section 1B of the film head. This open region receives the backing pad 26, hot shoe 42 and flash housing 46 at the imaging, developing and image transfer stations 10, 12 and 14. The film then passes over a takeup lip 90 on the takeup side of the imaging area and then proceeds over a dancing roller 94 carried on an arm 95 tensioned by a spring 93 which forces the roller away from the takeup lip 90, and serves to keep the film under tension. The film then winds on a motor driven takeup reel 98 driven by a locking takeup motor (not shown) mounted on the frame 64. The takeup reel 98 is mounted on a drive shaft 98′ which makes connection to the motor in any suitable way, such as by a pulley belt coupling. The entire film head 1 can be removed from the carriage 2 by removing the screws 63—63 and raising the film head therefrom, where the film can be threaded through the film head conveniently away from the carriage.

Figure 5B:
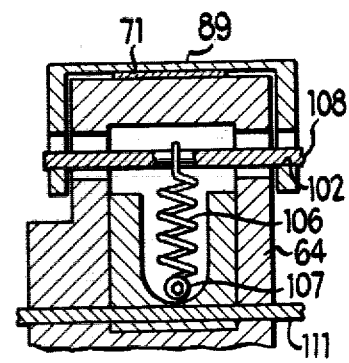
FIG. 5B is a fragmentary sectional enlarged view of the latching mechanism for the film head cover.
Figure 6:
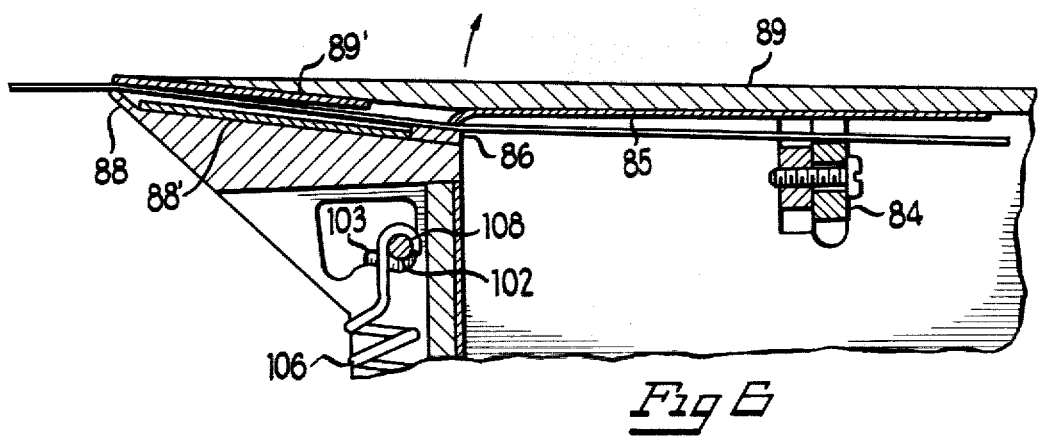
FIG. 6 is a fragmentary sectional view of the payout lip region of FIG. 4, showing the clamping blade and clamping block in their film clamping condition.

The film clamping means referred to as illustrated includes a clamping blade 85 pressed down against the intermediate film at the clamping block 86 located on the supply side of the film head imaging area. FIGS. 5A and 6 show details of the clamping blade. As there shown, the blade 85 is affixed to the inside of the film head cover 89. The film head cover 89 pivots on a cover hinge 100 to form a light-tight enclosure when in the closed position, as shown in FIG. 3, being held in the closed position by a spring loaded toggle pin 108, as shown in FIGS. 5A and 5B, which serves to compliantly latch the cover 89 in a closed position. Latching tension for the cover 89 is applied to two shoulder recesses 102 in the cover 89 by the force of a toggle spring 106, anchored at its lower end by a wrap about a frame supported pin 107, and anchored at its top end to the center of the toggle pin 108, as shown in FIG. 6. In the closed position the tension of the toggle spring 106 draws the cover 89 downwards, thereby forcing the clamping blade 85, which is secured to the interior of the cover 89 (see FIG. 6), to clamp the film 71 against a clamping back 86, thereby immobilizing the film strip against payout. The toggle pin 108 is loosely trapped in the latch handle 110, the handle being rotatable about a latch handle pin 111 to lock the cover 89 down, the latch handle 110 is rotated to force the toggle pin 108 up and over the shoulders 103, to settle into the cover locking recesses 102 under tension of the toggle spring 106.

FIG. 5A shows the clamping blade release apparatus. The clamping action of the blade 85 is by energizing a film clamp lift solenoid 112 at the beginning of the film frame advance operation, thereby drawing down the outer end of a lift bar 114 about pivot 115 and raising its interior end carrying the film clamp lift 84 so as to force the lifter into contact with the interior face of the cover 89 against the force of the toggle spring 106. This raises the cover sufficiently to raise the clamp blade 85 out of its film engaging position. At the end of a film advance operation the system timing and control circuit 7 simultaneously deenergizes the film clamp lift solenoid 112 and the film advance motor (not shown), which drives the takeup reel 98. The intermediate film strip 71 is thereby against clamped in position and the inertial effect of the locking takeup motor (not shown) as it slows to a stop tensions the spring loaded dancing roller 94, thereby holding the film strip in tension for the next operating cycle.

FIG. 5A shows the latch handle 110 connected through an actuating arm 116 to engage and actuate a film head interlock switch C. The interlock switch C indicates the status of the latch handle 110, and causes the system timing and control circuit 7 to hold the system in a power-off condition when the cover is open.

Figure 7B:
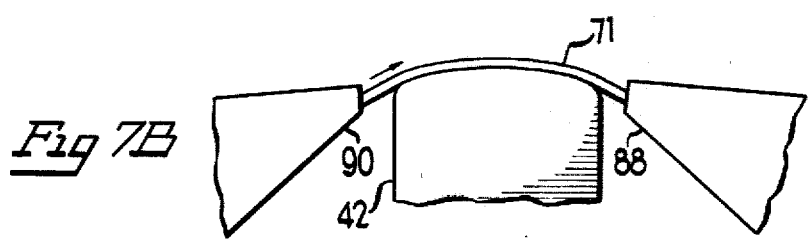
Figure 7C:
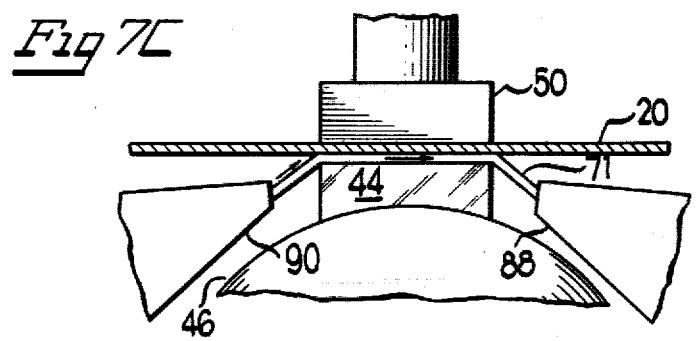

FIGS. 7A through 7C show plan views of the film head 1 in the region of the imaging area of the film head during image exposure (FIG. 7A), development (FIG. 7B), and image transfer (FIG. 7C). Since the intermediate film 71 is rigidly clamped internally by the clamping blade 85 (see FIG. 4) on the payout side, the film is fixed in position at the payout lip 88. However, the compliant tensioning of the film by the spring loaded dancing roller 94 on the takeup side permits film shifting to take place on the takeup side as shown by arrows in FIGS. 7A, 7B, and 7C when the backing pad 26, hot shoe 42 and flash housing 46 are raised into position. This prevents breakage of the intermediate film 71 under the forces involved. However, equal film shifting is necessary at the imaging and image transfer stations (see FIGS. 7A and 7C) to ensure proper centering and alignment of initial and add-on images transferred from a frame of the intermediate film strip to the selected microfiche film card frame. This equal shifting of the intermediate film relative to the clamped side of the exposed area thereof is assured by providing equal upward movement of the backing pad 26 and flash housing 46 from the point where the film is raised thereby, and by making the width of the backing pad 26 equal to the width of the flash prism 44. (Of course, a similar equal shifting of the film would take place if the lens shroud 22 at the imaging station 10 were to depress the plane of the intermediate film 71 by an equivalent distance against the backing pad 26 to which the film is raised at the image transfer station. In this configuration it is the width of the base of lens shroud 22 that should be identical with the width of the flash prism 44 to insure equal film displacement. The use of this latter configuration to achieve proper system clearances and allow a unitary backing pad and projection light source is the subject of a co-pending application by the applicants). Also, it is necessary that the microfiche film card 20 be prevented from contacting the film head structure during image transfer, and in order to prevent such contact, the flash housing 46 is raised to press the intermediate film 71 up into bowed configuration above the film head structure where it then contacts the film card.

Thus, the problems of uniform film heating, cassette clearance, and maintenance of image registry are solved by employing in combination clamping one lateral side of the exposed film area, compliantly tensioning the other lateral side, and providing for equal bowing displacement of the film at the imaging and transfer stations.

As used herein in specifications and claims, the term "compliant" will be taken to imply reversibly compliant, i.e. capable of yielding to an increase of applied force or elastically restoring position on reduction of such a force.

FIG. 9 shows details of an intermediate film feed control means incorporated into the film head 1. Actuation of a film advancing means 340 in the system timing and control circuit 7 causes the intermediate film to advance under tension over the encoder roller 82 as previously described, causing the encoder roller to rotate. The advancing means 340 controls the sequencing of the supply means E, the takeup means F, and the clamping means B in FIG. 1. The rotation of the encoder roller 82 is detected by a light sensing unit 126 mounted on the frame 64, and which monitors the passage of opaque interruptor lines 128 on a transparent encoder wheel 130 attached to the outboard end of the encoder roller shaft 132, the wheel, shaft, and roller being rigidly interconnected. The passage of a line 128 interrupts a light beam from a light source 127 to a photodetector 129. The series of light pulses detected by the light sensing unit is transmitted to the system timing and control circuit 7 as the intermediate film pays out over the encoder roller 82 during film advance. The pulses are counted by the system timing and control circuit 7. When the count reaches a predetermined value the system timing and control circuit 7 terminates power to the film advance motor (not shown), which drives the takeup reel 98. Film breakage during the film advance process causes loss of tension in the intermediate film 71, resulting in loss of friction contact between the film and the encoder roller 82. The encoder roller ceases to turn, and the sensing pulses cease as a result. Cessation of such pulses causes the system timing and control circuit 7 to abort the cycle and actuate a film break warning 25.

FIG. 9 further contains the related control circuitry to accomplish the foregoing in block diagram format. The film advance operation, like all other automatic sequencing operations carried out in the microfiche recording system, is governed by microprocessor execution of a stored program in read-only memory, both the microprocessor and the memory being integral to the system timing and control circuit 7. The light source 127 is energized by the system timing and control circuit 7 prior to film advance. A pulse from a film advance control circuit 330 within the system timing and control circuit 7 clears a pulse counter 332, preferably of the simple ripple type. The pulse counter 332 receives the output pulses from the photodetector 129 and proceeds to store the pulse count. During this period the stored program executes a conventional timing loop of duration somewhat in excess of that necessary to advance one frame, the program flow branching at regular intervals to sense the contents of the counter 332 by activating periodically a counter comparison means 334. The counter comparison means 334 preferably consists of replicating the current pulse count in the A register of the microprocessor and comparing it with a preset stored number equal to the number of photodetector pulses characterizing one frame. When the requisite count is detected film advance ceases, and the program brances out of the timing loop and normal program flow continues. If, however, the film breaks and the pulses cease, the requisite pulse count is never attained and the timing loop runs its full cycle, whereupon the program proceeds to actuate an abort means 336 which preferably consists of terminating program sequencing by entering a program "halt" state and actuating the film break warning means 25. The timing loop is shown functionally as "timing means" 338 in FIG. 9.

A schematic program for carrying out the foregoing sequence is shown in FIG. 18. Two initial preset values NTEST and TCOUNT are stored in the microprocessor register NTEST is the number of pulses corresponding to the requisite film advance, and TCOUNT is a timing initialization number used to govern the abort sequence. The operation labeled BEGIN ADVANCE actuates the film advance circuitry. The operation labeled RESET/DELAY represents a simple cyclic timing loop requiring a preset number of cycles before allowing linear program to flow to be resumed. The next step decrements the stored value of TCOUNT by one unit, whereupon the new value of TCOUNT is compared to zero. Branching to a terminal function labeled ABORT will occur if TCOUNT reaches zero, otherwise the program flow continues on to read and store the contents NPULSE of the pulse counter 332. Next this stored value NPULSE is compared with NTEST, the program flow branching to terminate film advance and continue the remainder of the system operations if the pulse count equals or exceeds NTEST. If the pulse count is not high enough, the program flow returns for additional tours through the loop until the requisite pulse count is achieved, or until the preset time has elapsed.

Figure 8:
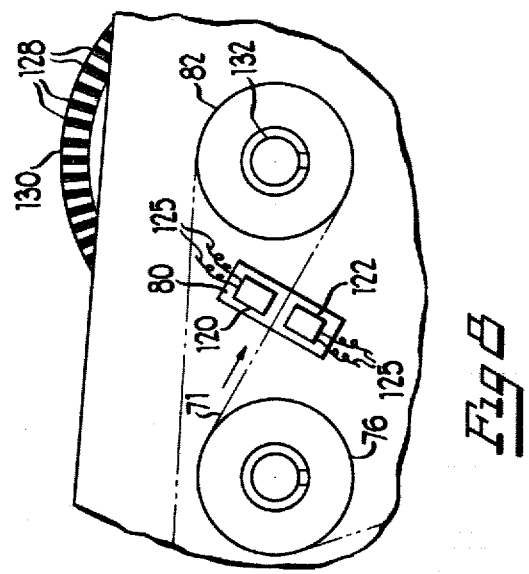
FIG. 8 is a fragmentary elevational view of guide rollers and the end-of-film sensor located above the cassette of the film head.

There is a period of vulnerability to film break from the time the film advance pulse count from the photodetector 129 reaches its predetermined value to the time the clamping blade 85 drops to clamp the intermediate film 71. A film break at any point between the tensioning pad 78 and the blade 85 at this time will cause an instantaneous loss of tension which will not be detected by the encoder roller system. Since end-of-film is fully equivalent to a film break in this situation, it is clear that this risk must be encountered once for every film cassette used. The stringent requirements concerning protection against archival record loss via film break make a separate end-of-film sensor desirable. Accidental film break is unpredictable and reasonably rare. End-of-film is routinely encountered and completely predictable using an appropriate sensing method. A separate film break sensing system which does not depend on the absence of pulses generated by the light sensing unit 166 during film advance operation is desired. A backup end-of-film sensing method is therefore employed. FIG. 8 shows a phototransmission end-of-film sensor unit 80, which consists of an infrared light source 120 and a photodetector 122. Light from the source passes through the film 71 and continuously monitors for the appearance of a specially applied dark region 124 (FIG. 2) positioned on the film so as to appear immediately before the film supply is exhausted. Interruption of the light beam signals to the system timing and control circuit 7 via the sensor leads 125 that and end-of-film condition is imminent, resulting in activation of an end-of-film warning means 25'.

Alternative forms of end-of-film sensors may be equally well employed, and include photosensing a reflecting mark on the film or mechanically sensing notches, holes, or similar local modifications of the film by means well known to the art.

An alternative form of the exemplary form of the invention is shown in FIGS. 10 through 13. In this form of the invention, the cassette 62 of FIGS. 2 through 4 is replaced by a replaceable pre-film-loaded supply reel 134 and a housing 138 therefor permanently a part of the frame 64, the reel being removably mountable on a drag force producing friction hub assembly 136 attached to the film head frame 64. The takeup reel 98 is also modified and lockingly engages a modified hub 136' which can also receive the supply reel which becomes a takeup reel after the film strip is completely wound on the takeup reel 98. The housing 138 has a cover 140 which when closed isolates the film on the reel from further exposure to ambient light. The hub assembly 136 consists of a shoe carrier 142 rigidly attached to the film head frame 64 and four friction shoes 144 in the shape of sectors of cylindrical shells, the shoes being slideably engaged in the shoe carrier, the shoes further being forced outward by four compressed shoe springs 146.

The film supply reel 134 is provided with a cylindrical hub bore 148 to accommodate the hub assembly 136. The outermost ends of the friction shoes are beveled such that when the film supply reel is placed into sliding engagement with the hub assembly the friction shoes are radially displaced inwards, compressing the shoes springs 146, and thereby facilitating mounting the reel. FIGS. 12A, 12B, and 12C show the reel mounting sequence. After mounting, the spring-loaded shoes 144 create a friction drag upon the interior surfaces of the hub bore 148 and thus serve to provide a drag force on the reel 134 so that the tensioning force applied to the film by the dancing roller 94 will not cause unwinding of the film from the reel. This embodiment is more expensive than the cassette system previously described, but features an improved pretensioning system and less chance of reel jamming occasionally encountered in cassette systems.

A film advance motor (not shown) carried on the frame 64 drives a hub 136' which is provided with three convex engaging flutes 152. The film supply and takeup reels are provided with three matching concave grooves 154 and 154' in the hub bores 148 and 148', such that either reel may be placed on the drive hub 136'.

Figure 10:
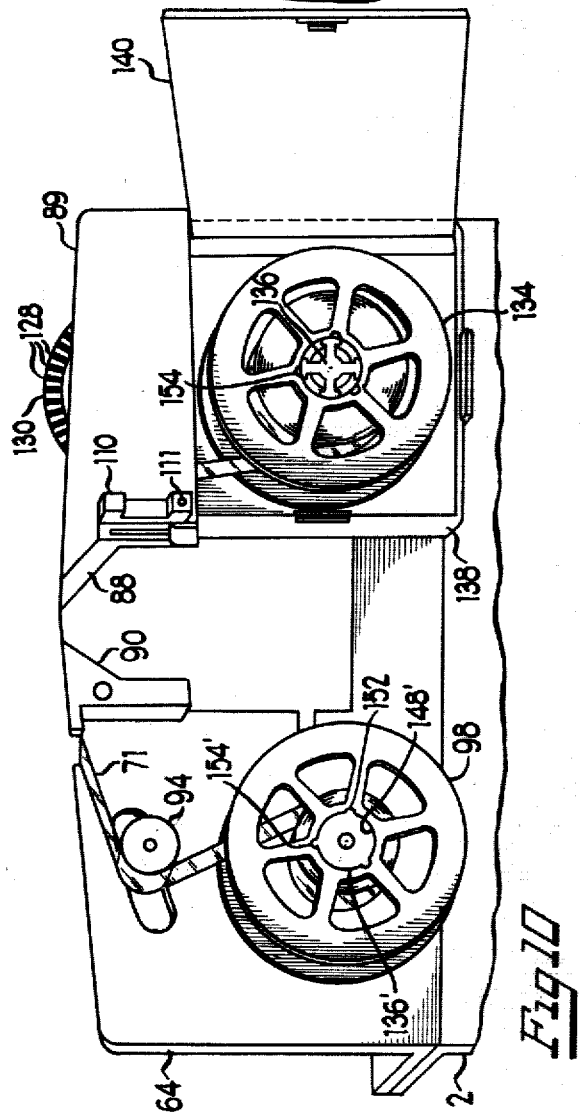
FIG. 10 is a perspective view of an alternative embodiment of the film head employing a supply reel and friction hub assembly instead of a removable cassette as shown in FIGS. 2-4.
Figure 13:
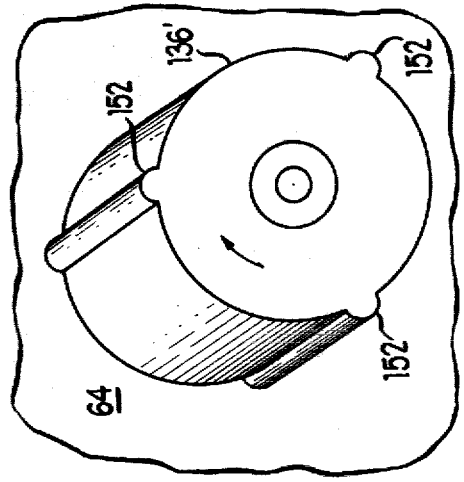
FIG. 13 is a perspective view of the drive hub of the takeup reel shown in FIG. 10.

FIGS. 16A, 16B and 17 show an alternative embodiment of an end-of-film sensor to be used in conjunction with the reel and hub assembly of FIG. 10. The friction shoes 44 and the shoe springs 46 have been omitted for clarity. Two oppositely disposed shoe carrier posts 218 contain plunger passages 220 as shown. Each plunger passage 220 contains a plunger assembly, each such assembly consisting of a plunger head 222 a plunger shaft 224 and an electrically conducting plunger limit stop 226. The plunger shafts 224 pass through electrically insulated plunger guides 228. The plunger heads 222 are urged radially outward by plunger springs 230. A film dispensing reel 232 is provided with three slots 234 so that when the reel is empty a plunger head 222 may pass freely outward through such slot until the plunger limit stop 226 restrains further outward motion by striking against the face of the plunger guide 228 as shown by the dotted lines in FIG. 17.

When more than one wrap of intermediate film 71 is tensioned about the reel 232, the friction between the film and the cylindrical surface 236 of the takeup reel 232 holds the film in place, and outward movement of the plunger heads 222 is restrained by the presence of the film. When the last wrap pays off during film advance tension in the film is lost, resulting in unrestrained outward travel of the plunger head 222 until the plunger limit stop 226 strikes two electrical contact elements 238 mounted on the face of the insulated plunger guide 228. The plunger limit stop 226 bridges the contacting elements 238 to form an electrical switch to ground, the closure of which is communicated to the system timing and control circuit 7 by means of an insulated lead 240. Two plunger assemblies are used because of the necessity for retaining mechanical integrity in the slotted reel 232. Three bridging webs 242 in the reel 232 serve to provide the necessary mechanical integrity of the reel. Passage of any one of these bridging webs over a plunger head compresses the head back into the plunger passage 220 and temporarily renders the individual sensor incapable of detecting an end-of-film condition by restraining the plunger head from access to the film. By employing three bridging webs 242 and two oppositely disposed plunger assemblies, one plunger head is in contact with the film wrap at all times. The two pairs of contact element 238 are wired together so as to constitute a pair of switches to ground in parallel, the closure of either one serving to actuate the system timing and control circuit to an end-of-film condition.

FIGS. 14, 15A and 15B show an alternative embodiment which is the invention of Herbert C Ovshinsky alone, consisting of a modified frame 162', removably engageable by means of bolts (not shown) through holes 165 with a carriage 64 of the general type shown in FIG. 3, and a large cassette 160 removably mountable on the frame by means of clips 161. The cassette 160 is preloaded with intermediate film 71 thus relieving the operator of the necessity of threading film through the system when changing to a fresh supply of intermediate film. The cassette 160 is locked in place, as by clips 161—161 on the frame 162'. The frame 162' carries a lockable film advance motor 166 and a lockable film tensioning motor 164. A lockable motor has a shaft which when the motor is de-energized is locked in position. A supply of intermediate film 71 is carried on a supply reel 168 inside the cassette 160, the supply reel being configured with a non-circular supply reel drive socket 170 configured to lockingly engage a similarly shaped supply reel drive shaft 172 driven by the film advance motor 166. Similarly, a film takeup reel 174 lockingly engages a takeup reel shaft 176 by means of a takeup reel drive socket 178, the takeup reel shaft 176 being driven by the film tensioning motor 164. The shafts 172 and 176 project from the carriage frame 162'. The intermediate film 71 is paid off from the supply reel 168 where it passes over an idler roller 180, then over and in close proximity to a first sensing aperture 182 (FIG. 15A), then exiting the payout side of the cassette over a payout lip 184 against which the film is pressed by the tension in the film. The film is there exposed at the imaging area of the cassette. The film enters the takeup side of the cassette via a takeup lip 186 and then passes over a takeup idler 188 rotatably mounted at the end of an idler support arm 190, the idler support arm being in turn rotatably mounted to rotate freely about a wallmounted pivot (not shown). In the exemplary form the pivot is located behind the takeup reel 174. A takeup idler spring 194 urges the idler support arm 190 and takeup idler 188 away from the takeup lip 186, thus tensioning the film strip 71. In the normal position of the support arm 190, the support arm is opposite an arm position sensing opening or window 200 in the rear wall 199 of the cassette. The film payout sequence is initiated by the energization of advance motor 166 for a predetermined period, which results in the outer and left movement of the arm 190 away from the window 200 under the force of spring 194. The advance motor 166 is controlled by the system timing and control circuit 7. The spring 194 takes up the slack in the film caused by rotation of the advance motor 166, thus causing payout of the film from the supply reel 168. Film advance is terminated by de-energization of the advance motor 166, resulting in a locking action against further payout, whereupon the system timing and control circuit 7 operates the film tensioning motor 164 to energize the same. This drives the takeup reel 174 so as to wind in the intermediate film 71 thereon. The resulting tensioning of the film strip 71 causes the takeup idler support arm 190 to move toward the sensing opening or window 200.

Mounted opposite the sensing opening or window 200 on the carriage frame 162' is a reflection photosensor 202 which when it detects the presence of the idler support arm 190 communicates a halt signal to the system timing and control circuit 7 whereby de-energizing the tensioning motor 164, leaving the film 71 under compliant tension supplied by the takeup idler spring 194. The system timing and control circuit 7 also responds to the absence of a signal from the photosensor 202 by inhibiting the flash pulser 52 from firing by elementary gating logic means until the idler support arm 190 is detected by the photosensor 202, indicating proper film tension. A film break will cause the arm 190 to move away from the sensing opening or window, preventing a flash operation which could result in the loss of a record on the exposed frame of the film card should a film break condition occur, which obviously removes or displaces the desired frame of the intermediate film from the imaging area of the cassette. A light barrier 209 prevents any light entering the cassette 160 via the sensing opening or window 200 from fogging the unexposed film 71 on the supply side 1A' of the cassette.

The length of time the advance motor 166 is energized is determined by the signal generated by an infrared reflection photosensor 206 interrogating the film strip 71 as it passes the sensing aperture 182. The photosensor 206 projects from frame 162' into the cassette 160 through an opening in a light tight shroud 252 on the cassette which shroud has the aperture 182. The film strip 71 (FIG. 15B) has opaque markers or lines 210 spaced one frame length apart. The photosensor 206 is connected to the system timing and control circuit 7, and an advance motor energizing cycle is terminated upon detection of the passage of the next opaque framing line 210 (FIG. 15B) on the intermediate film strip 17 by the photosensor 206. FIG. 15A shows details of the reflection photosensor 206 and the first sensing aperture 182 when the cassette 160 is mounted on the frame 162. The photosensor 206 is of the conventional line-sensing type, consisting of a light source and a photodetector (not shown) designed to emit a spot of light and respond to a reflection thereof from a reflecting element 212 mounted on the inside of the upper wall of the cassette 160.

The opaque framing lines 210 moving past the photosensor 206 intercept the emitted light resulting in the generation of the requisite timing signal. The photosensor 206 is so positioned that the framing lines 210 are properly positioned on either side of the imaging area 9 when a frame line 210 passes the photosensor. These lines can thus act as light absorbers inhibiting fogging of the unexposed portions of the intermediate film strip by light piping caused by the high intensity flash light at the image transfer station. As previously indicated, interruption of the reflected light by a line 210 causes the system timing and control circuit 7 to de-energize advance motor 166 to terminate film advance.

An incipient end-of-film condition is signaled by the absence of framing lines near the end of the film 71 as shown in FIG. 15B. Failure of the photosensor 206 to detect a framing line within a preset time after initiation of film advance causes the system timing and control circuit 7 to actuate the end-of-film warning means 25' and abort the replication sequence by elementary program branching techniques involving a timing loop. Possible alternative methods for sensing film advance and end-of-film would include mechanical sensing of notches, holes or similar mechanical discontinuities in or on the film by conventional mechanical sensing means.

The sensors for film advance and end-of-film may also be placed between the payout lip 88 and the takeup lip 90, or on the takeup side of the cassette 160. Direct film advance and end-of-film marker sensing by infrared photoreflection sensors stationed opposite infrared transparent cassette windows which bar entry of visible light is also envisioned.

While for the purposes of illustration, various forms of this invention have been disclosed, other forms thereof may become apparent to those skilled in the art upon reference to this disclosure and, therefore, this invention shall be limited only by the scope of the appended claims.

We claim:

1. In a microfiche film recording system including movable supporting means for supporting an intermediate film strip, film advancing means for advancing a selected area of said film strip into an imaging position thereon, carriage means for moving said supporting means between an imaging station where said selected area of said film strip is exposed and an image transfer station where said image on said selected area is transferred to a microfiche photographic film having frames upon which said image is to be transferred, means for controllably positioning said microfiche photographic film with respect to the selected imaged area of the intermediate film strip, means for transferring said image to a selected frame of said microfiche film, and at least one pressure-applying means which engages with said intermediate film to create tension stresses therein potentially capable of inducing erratic shifting of said film strip and which can cause registration errors in the image transfer to said microfiche photographic film, the improvement comprising film strip holding means movable with said film strip supporting means as said supporting means is moved back and forth by said carriage means between said imaging station and said transfer station and having a film holding condition causing at least one lateral margin of said film strip to be fixed in position at said imaging position and a film releasing condition position, permitting or causing longitudinal movement of the film strip, control means for said holding means for operating said holding means in said holding condition during the exposure of said intermediate film strip and during the movement of said supporting means to said image transfer station and during the transfer of said image thereon to said microfiche photographic film, said control means operating said holding means to said film releasing condition following an image transfer operation, and means for operating said film advancing means for advancing a new unexposed area of said intermediate film to said imaging position during the operation of said holding means in said film releasing condition so that a new area is in position for imaging prior to the next operation of said holding means to said holding condition.

2. The microfiche film recording system as recited in claim 1 wherein said holding means comprises means for fixing the position of said intermediate film strip on only one lateral side of said selected area thereof and means for applying compliant tension on the opposite lateral side of said selected area.

3. The microfiche film recording system as recited in claim 2 wherein said means for applying compliant tension is a tensioned dancing roller, said dancing roller being disposed to engage and support said intermediate film strip and impart a tensile force thereto.

4. The microfiche film recording system as recited in claim 1 wherein said holding means comprises clamping means including a film backing member and a pressure member affixed to a movable pressure member support for carrying said pressure member towards and away from said backing member, said clamping means further including tensioning means for urging said pressure member towards said backing member, said control means including means for overcoming said tensioning means to actuate said clamping means to a released position.

5. The microfiche film recording system as recited in claim 4 wherein said pressure member is in the form of a blade and said backing member is in the form of a complaint friction block.

6. The microfiche film recording system as recited in claim 4 wherein said movable pressure member support is in the form of a cover for a portion of said intermediate film.

7. The microfiche film recording system as recited in claim 6 wherein said cover for a portion of said intermediate film forms a light-tight environment for the same.

8. The microfiche film recording system as recited in claim 6 wherein said cover for a portion of said intermediate film forms a dust cover for the same.

9. The microfiche film recording system as recited in claim 6 wherein said cover for a portion of said intermediate film forms a light-tight environment and a dust cover for the same.

10. The microfiche film recording system as recited in claims 6, 7, 8, or 9 wherein said tensioning means for urging said pressure member serves to lock said cover in a closed position.

11. The microfiche film recording sysem as recited in claim 1 or 2 wherein said supporting means and said film advancing means are affixed to a common frame, said frame being removably attached to said carriage means.

12. The microfiche film recording system as recited in claim 2 wherein there are pressure applying means which engage the intermediate film strip both at the imaging station and image transfer station and effect thereat a bowing of the intermediate film and a resulting displacement thereof in a direction parallel to the plane of the film, said pressure applying means being adapted to effect the same degree of movement of said film thereat so that equal amounts of longitudinal shifting of the film will take place at these two stations relative to the fixed side of the imaging area thereof, to assure proper centering or registration of the image ultimately transferred to the selected frame of the microfiche photographic film.

13. In a microfiche film recording system comprising supporting means including guide and takeup means for receiving an intermediate film strip extending from a cassette and means for removably receiving said cassette; film advancing means for advancing a selected area of said film strip into an imaging position; carriage means for moving said supporting means between an imaging station where said selected area of said film strip is exposed and an image transfer station where said image on said selected area is transferred to a microfiche photographic film having frames upon which said image is to be transferred; means for controllably positioning said microfiche photographic film with respect to the selected imaged area of the intermediate film strip; and means for transferring said image to a selected frame of said microfiche film, the improvement wherein said supporting means including said guide, takeup and cassette receiving means are mounted on a common frame, and means for removably attaching said common frame upon said carriage means so that the frame with said guide, takeup and cassette receiving means can be removed from said carriage as a unit and a fresh cassette of film mounted on said receiving means with the film in said cassette threaded over said guide and takeup means at a convenient location.

14. In a microfiche film recording system comprising: supporting means for supporting an intermediate film strip, film advancing means for advancing a selected area of said film strip into an imaging position thereon, carriage means for moving said supporting means between an imaging station where said selected area of said film strip is exposed, and an image transfer station where said image on said selected area is transferred to a microfiche photographic film having frames upon which said image is to be transferred, means for controllably positioning said microfiche photographic film with respect to the selected imaged area of the intermediate film strip, and means for transferring said image to a selected frame of said microfiche film, the improvement wherein said supporting means includes a fixed supply reel support hub with drag means for retarding rotation of an intermediate film strip supply reel mounted thereover, an intermediate film strip supply reel having a hub bore slidably and removably engaging said fixed supply reel support hub, a takeup reel for taking up said intermediate film strip, a takeup reel support hub, said takeup reel support hub being driven by said advancing means and lockingly receiving said takeup reel, and tension applying means which applies a pull on the film leaving said supply reel which is opposed by said drag means so that there is tension applied to the film leaving the supply reel without causing rotation of said supply reel.

15. The microfiche film recording system of claim 14 wherein said supporting means including said supply and takeup reels are supported on a common frame, and there is provided means for removably attaching said common frame to said carriage means so that the frame with said reels attached thereto can be removed from said carriage and a fresh supply reel of film can be mounted on said supply reel support hub and the film applied to said takeup reel at a convenient location.

16. The microfiche film recording system of claim 14 or 15 wherein said supply reel and takeup reel hubs are of the same size to support either said supply or takeup reels, whereby said supply reel can act as a takeup reel when the film strip thereon has been completely wound upon said takeup reel.

17. A microfiche film recording system comprising movable supporting means for supporting an intermediate film strip, said supporting means including means for receiving and guiding said film strip between film strip supply and takeup means; film advancing mean for advancing a selected area of said film strip into an imaging position thereon; carriage means for moving said supporting means between an imaging station where said selected area of said film strip is exposed and an image transfer station where said image on said selected area is transferred to a microfiche photographic film having frames upon which said image is to be transferred; means for controllably positioning said microfiche photographic film with respect to the selected imaged area of the intermediate film strip; means for transferring said image to a selected frame of said microfiche film by directing radiant energy through the selected area of said film strip onto said microfiche film; film movement sensing means for sensing the movement of said intermediate film strip during the period of operation of said film advancing means; control means responsive to said film movement sensing means to respond to the absence of said film movement during said period for preventing at least the transfer of an image from said intermediate film strip to said microfiche photographic film; and alarm means responsive to said control means for alerting an operator.

18. The microfiche film recording system of claim 17 wherein said supporting means comprises rotatable idler roller means for receiving and guiding said film strip between said film strip supply and said takeup means, and wherein said film movement sensing means comprises means for sensing the rotation of at least one roller of said idler roller means.

19. The microfiche recording system of claim 18 wherein said means for sensing the rotation of at least one roller produces a train of signal pulses during said period such that the number of said pulses produced during said period constitutes a measure of the amount of said intermediate film advanced during said period; wherein said control means comprises means for counting said pulses during a time interval wholly containing said period; and wherein said control means further comprises comparison means for comparing the pulse count produced during said interval with a preset value corresponding to the desired amount of film advance, whereby said absence of film movement is indicated by said pulse count being less than said preset value.

20. The microfiche film recording system of claim 19 wherein said means for sensing the rotation of at least one roller includes a wheel coupled to be rotated by said idler roller means, spaced markers on said wheel, and pulse generating means for generating pulses in response to the passage of said markers thereby.

21. In a microfiche film recording system comprising movable supporting means for supporting an intermediate film strip, said supporting means including means for receiving and guiding said film strip between film strip supply and takeup means and tension applying means for providing a given tension in the film; film advancing means for advancing a selected area of said film strip into an imaging position thereon; carriage means for moving said supporting means between an imaging station where said selected area of said film strip is exposed and an image transfer station where said image on said selected area is transferred to a microfiche photographic film having frames upon which said image is to be transferred; means for controllably positioning said microfiche photographic film with respect to the selected imaged area of the intermediate film strip; and means for transferring said image to a selected frame of said microfiche film, the improvement comprising means responsive to reduction in the tension in said film below a given level caused by a film breakage or other cause of tension loss for alerting an operator and preventing at least the transferring of an image from said intermediate film strip to said microfiche photographic film.

22. The microfiche film recording system of claim 21 wherein there is also provided means for sensing when the intermediate film supply is substantially exhausted, and means responsive to said means for alerting an operator and preventing at least the transfer of an image from said intermediate film strip to said microfiche photographic film.

23. The microfiche film recording system of claim 21 or 22 wherein said tension applying means includes means urged against said intermediate film which, when the tension in said film is reduced below said given level, moves from a given reference position, and said means responsive to the reduction of said film tension includes means responsive to the movement of said tension applying means from said reference position.

24. A microfiche film recording system comprising movable supporting means for supporting an intermediate film strip, said supporting means including means for receiving and guiding said film strip between film strip supply and takeup means; film advancing means for advancing a selected area of said film strip into an imaging position thereon; carriage means for moving said supporting means between an imaging station where said selected area of said film strip is exposed and an image transfer station where said image on said selected area is transferred to a microfiche photographic film having frames upon which said image is to be transferred; means for controllably positioning said microfiche photographic film with respect to the selected imaged area of the intermediate film strip; means for transferring said image to a selected frame of said microfiche film; and end of film detecting means for sensing an end-of-the-film marker on said intermediate film indicating that the last available area thereon has been imaged, and control and alarm means responsive to said detecting means for alerting an operator when said marker is sensed thereby and for preventing at least the transfer of an image from said intermediate film strip to said microfiche photographic film.

25. In a microfiche film recording system comprising: movable supporting means for supporting an intermediate film strip, said supporting means including a first hub for receiving a supply reel of said intermediate film, a second hub for receiving a takeup reel for said film, and means for receiving and guiding said film strip between said supply and takeup reels and past an imaging area; carriage means for moving said supporting means between an imaging station where said selected area of said film strip is exposed and an image transfer station where said image on said selected area is transferred to a microfiche photographic film having frames upon which said image is to be transferred; means for controllably positioning said microfiche photographic film with respect to the selected imaged area of the intermediate film strip; and means for transferring said image to a selected frame of said microfiche film; the improvement comprising a supply reel mounted on said first supply reel-receiving hub, said supply reel having a central bore fitting over said first hub and windings of film exposed to said bore through an opening, said second supply reel-receiving hub having outwardly urged film sensing means movable against said film on said supply reel through said opening, said outwardly urged film sensing means being held in a retracted reference position by said film where there are many wrappings of film on said supply reel, said film sensing means being permitted to move outwardly beyond said reference position in the absence of a tight wrapping of film on said supply reel, and means responsive to the movement of said outwardly urged film sensing means beyond said reference position for alerting an operator and for preventing at least a transfer of an image from said intermediate film strip to said microfiche photographic film.

26. In a microfiche film recording system including movable supporting means for supporting an intermediate film strip, film advancing means for advancing a selected area of said film strip into an imaging position thereon, carriage means for moving said supporting means between an imaging station where said selected area of said film strip is exposed and an image transfer station where said image on said selected area is transferred to a microfiche photographic film having frames upon which said image is to be transferred, means for controllably positioning said microfiche photographic film with respect to the selected imaged area of the intermediate film strip, means for transferring said image to a selected frame of said microfiche film, and at least two pressure-applying means which engage with said intermediate film to create tension stresses which are potentially capable of shifting said film strip laterally with respect to the initial film plane and which can cause registration errors in the image transfer to said microfiche photographic film, the improvement comprising film holding means movable with said film strip supporting means as said supporting means is moved back and forth by said carriage means between said imaging station and said transfer station and having a locking position causing one lateral side of said selected area of said film strip to be held in a fixed position and a released position, tensioning means for applying compliant tension on the opposite side of said selected area whereby only the one lateral margin of said selected area cannot shift, whereby the lateral margin of said film strip on said opposite side is allowed to pay out under compliant tension; control means for said holding means for actuating said holding means to said locking position during the imaging exposure of said intermediate film strip and during the movement of said supporting means to said image transfer station and during the transfer of said image thereon to said microfiche photographic film, said control means operating said holding means to said released position following an image transfer operation, means for operating said film advancing means for advancing a new unexposed area of said intermediate film to said imaging position during the operation of said holding means in said released position so that said new area is in position for imaging prior to the next operation of said holding means to said locking position, and limit means for limiting the pressure induced mechanical displacement of said film at said imaging station and at said transfer station to equal values, thereby causing equal lateral film payout from said tensioning means at said stations and causing the image on said intermediate film to be properly centered for said image transfer.

* * * * *